United States Patent [19]
Barnhill, III et al.

[11] Patent Number: 5,246,095
[45] Date of Patent: Sep. 21, 1993

[54] OUTPUT TORQUE SENSOR AND CONTROL APPARATUS

[75] Inventors: Martin L. Barnhill, III, East Troy; Mark T. Kuchta, Milwaukee, both of Wis.

[73] Assignee: Johnson Service Company, Milwaukee, Wis.

[21] Appl. No.: 855,287

[22] Filed: Mar. 23, 1992

[51] Int. Cl.$^5$ ............................................. H01H 19/18
[52] U.S. Cl. ............................... 192/150; 74/412 TA; 192/142 R; 200/47; 318/475
[58] Field of Search ............. 74/412 TA; 192/142 R, 192/150; 318/475; 200/47

[56] References Cited

U.S. PATENT DOCUMENTS

| | | | |
|---|---|---|---|
| 2,222,716 | 11/1940 | Mageoch | 318/475 |
| 2,232,545 | 2/1941 | Lum | 192/150 X |
| 2,403,094 | 7/1946 | Lear | 192/150 X |
| 4,320,317 | 3/1982 | Bowey | 318/475 X |

FOREIGN PATENT DOCUMENTS 133060 11/1978 Fed. Rep. of Germany ...... 192/150

*Primary Examiner*—Allan D. Herrmann
*Attorney, Agent, or Firm*—Joseph E. Root, III; E. L. Levine

[57] ABSTRACT

An output torque sensing and limiting mechanism, for preventing the continued application of torque to a load when the torque exceeds a selected value. The mechanism is positioned at the end of a gear train, meshed with the final gear and adapted to transmit the output torque to the load, through an output adapter. An input gear assembly includes a sector gear, meshed with the gear train, for receiving the input torque. A housing assembly is rotationally carried on the input gear assembly, with wing members extending to define a wing angle. The sector gear lies in the wing angle, with vertical gear ends adjacent each wing member. A torque sensor subassembly is carried in each wing member, consisting of a bearing button positioned in registration with the sector gear end, biased into position by a wave spring and adjustable by means of a retainer button. Microswitches are carried on the sector gear, located with the switch elements extending into the gap between the sector gear and each wing member. If the torque applied to the sector gear exceeds the resistance of the wave spring, the bearing button deflects and the wing member makes contact with the switch element, which in turn removes power from the gear train.

8 Claims, 3 Drawing Sheets

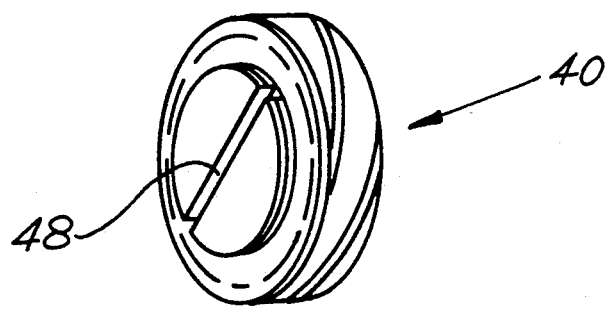
FIG. 4(a)
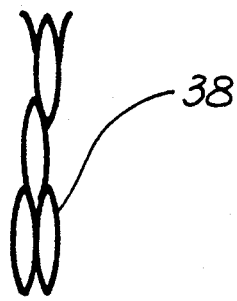
FIG. 4(b)
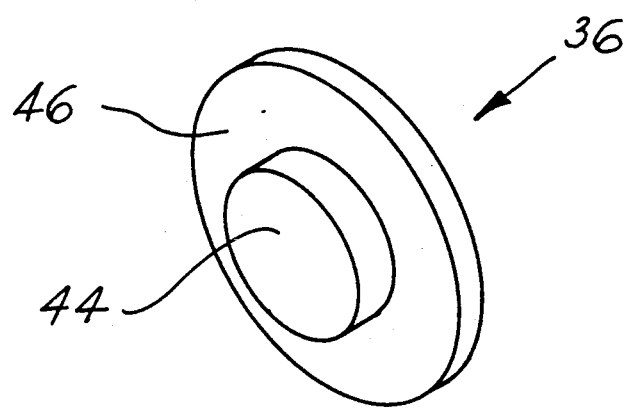
FIG.(4c)

OUTPUT TORQUE SENSOR AND CONTROL APPARATUS

BACKGROUND OF THE INVENTION

The present invention relates generally to the field of mechanical power controls, and more particularly to the field of overload prevention devices.

It has long been recognized that some cutoff means must be provided for stopping the application of torque through a power train, lest the power source continue trying to apply torque when the system cannot perform further rotation. The conventional approach to that problem is the provision of limit switches, positioned at the end of a normal range of travel in a system, to cut off motive power when the rotational element reaches that point. Such an arrangement is particularly common in systems where a power-driven rotating element is not positioned for easy service access.

An example of such a system is a damper actuator, found in widespread use in building heating, ventilating and air conditioning systems. There, an air supply duct is regulated by a damper, driven by a power source. Pneumatic power sources, in the past the most common type, presented no significant design problem, as such systems were easily controllable through pressure relief valves. Modern systems, however, derive motive power from electric motors, which apply torque to a damper shaft through a reduction gear train, typically at high torque levels.

The conventional solution of limit switches has been applied to such systems. That design, however, suffers from a serious limitation, as it assumes that the only occasion for removing power from the motor arises at the end of normal damper travel. That assumption ignores the possibility of an obstruction in the system, caused by a foreign object wedged in the damper itself, or some minor component failure. In that event, the motor will continue applying torque to the system until the damper or its shaft breaks, or until the motor burns out. In either event, the failure to provide adequate protection turns a simple problem into a complicated and expensive one.

What has been lacking is some means for sensing a torque overload and for removing power when that condition is present, regardless of the damper position. That lack is met in the present invention.

SUMMARY OF THE INVENTION

The broad object of the present invention is to provide a means for detecting a torque overload condition in a gear power system and for removing power from that system to prevent damage.

A further object of the invention is to provide a torque overload detector that functions without regard to the rotational position of the load element.

Yet another object of the invention is to provide a device that functions in a high torque environment, capable of rapidly identifying a torque overload condition and responding to that condition.

These and other objects are achieved in the present invention, an output torque sensor operable in a gear train to receive an input torque and transmit that torque as an output torque only if the output torque is less than a preselected value. A first element, an input gear assembly, includes a sector gear adapted to receive the input torque and to transmit an intermediate torque. A housing assembly, rotationally carried on the input gear assembly, is generally cylindrical in form, having two wing members radially extending to include a wing angle encompassing the sector gear, and adapted to receive the intermediate torque and to transmit the output torque. Finally, a torque sensing and control assembly is provided, for limiting the output torque to the preselected value. This assembly includes a torque sensor for determining the magnitude of the intermediate torque, with a sensor carried on each the wing member to extend therefrom into the wing angle, and a spring for allowing the sensor to change position on application of the intermediate torque from the input gear assembly. A pair of torque control switches, extending between each the wing member and the input gear, is adapted to send a control signal when the distance between the input gear assembly and a the wing member reaches a preselected value. In operation, an input torque applied to the input gear assembly is applied as the intermediate torque to the torque sensing and control means, which generates a control signal if the intermediate torque exceeds a preselected maximum output value. The intermediate torque otherwise is transmitted to the housing assembly and further output as the output torque.

BRIEF DESCRIPTION OF THE DRAWINGS

FIGS. 4 (a)-(c) depict the elements of the torque sensing subassembly of the embodiment shown in FIG. 1.

DETAILED DESCRIPTION OF A PREFERRED EMBODIMENT

Figure 1:
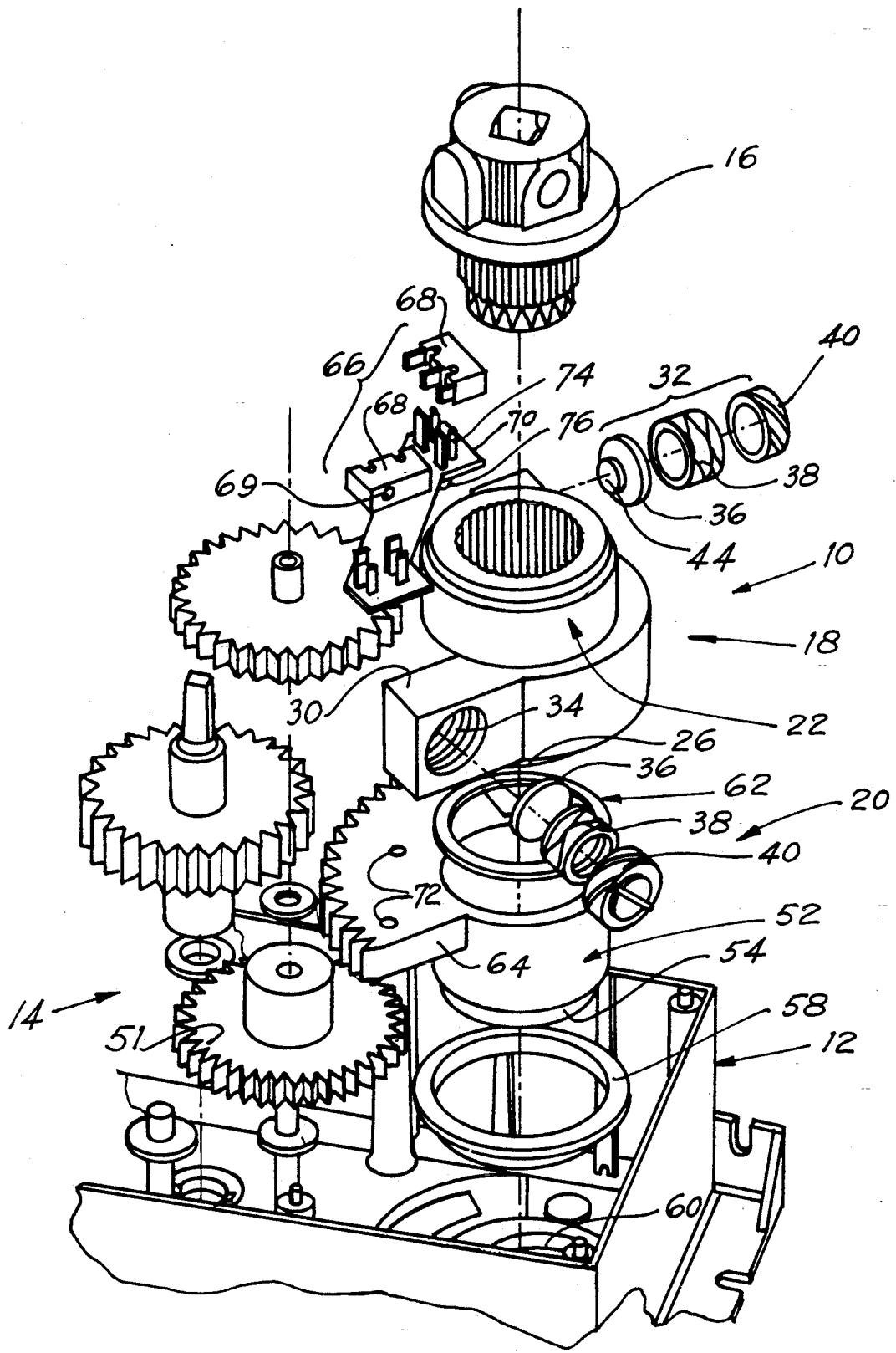
FIG. 1 is an exploded pictorial of an embodiment of the present invention, shown as installed in a gear power train.

A torque sensor 10 according to the present invention is shown in FIG. 1, as part of a damper actuator 12. As known in the art, the damper actuator obtains motive power from an electric motor (not shown), which power is fed through a train of reduction gears 14, and finally output to the damper shaft (not shown) through an output adapter 16. The torque sensor can be positioned at any convenient point in the power train, but it is preferred to locate it at the end of the gear train, immediately preceding the output adapter. As is common in the art, the damper actuator responds to signals from a control system (not shown) designed to regulate the temperature of a space within a building. It should be understood that the present invention has application to a wide range of power transmission devices, as will be appreciated by those of skill in the art, and the illustrated embodiment is chosen as a typical preferred embodiment, not by way of limitation.

Figure 2:
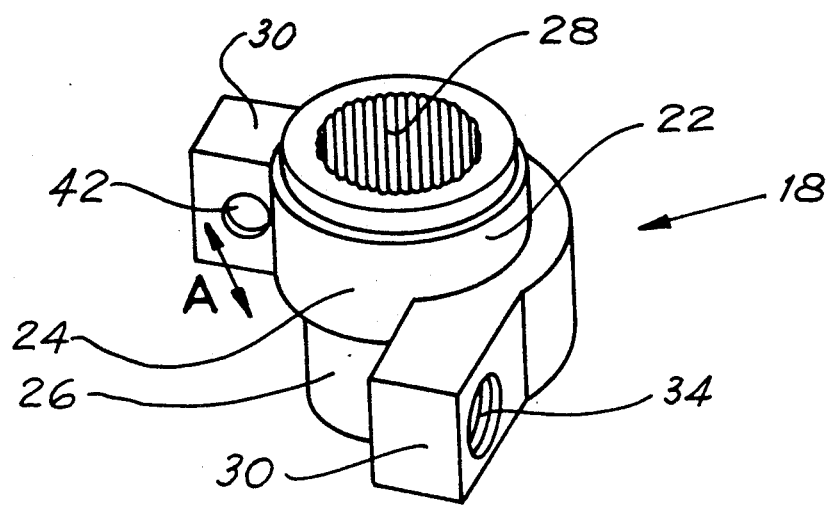
FIG. 2 is a pictorial of the housing assembly of the embodiment shown in FIG. 1.

The torque sensor is made up of two major assemblies, the housing assembly 18 and the input gear assembly 20. FIG. 2 illustrates the former unit in isolation for greater clarity. As seen there, the hub 22 of this assembly is generally cylindrical, with an upper portion 24 having a greater diameter than the lower portion 26. A central bore 28 extends lengthwise through the hub, and this bore is preferably splined to transmit torque to the output adapter. Other suitable transmission methods can be employed, as will be readily understood by those in the art. In keeping with its function, and attendant strength requirements, it is preferred to form the housing assembly from a cast metal, preferably a zinc alloy or other metal known in the art for such applications, such as aluminum. Of course, this element can also be fashioned by other known methods, such as machining, if desired.

Wings 30 extend radially outward from the housing hub, including therebetween a wing angle A. The factors underlying the choice of this angle will become apparent from the following discussion, but it is preferred that this angle be about 90 degrees. A square cross section for the wings has been found to provide a good combination of strength and compatibility with other elements.

Sensor subassemblies 32 are carried in each wing member. These assemblies consist of a bearing button 36, a wave spring 38 and a retainer button 40, shown individually in FIGS. 4 (a)-(c), respectively. The elements are carried in wing wells 34, formed in each wing member and each having a sensor aperture 42 opening into the area encompassed by wing angle A. This aperture has a smaller diameter than does the wing well itself, and bearing button 36 is designed so that a raised central bearing area 44 fits within the aperture diameter while retaining disc 46 similarly fits the well diameter. The central button is raised for a distance greater than the thickness of the wall remaining at the bottom of the wing well, so that this button surface protrudes beyond the wing surface. For improved contact, the raised bearing area may be formed slightly convex or sloped. Retaining button 40 serves to maintain the sensor and control subassemblies in position. The periphery of this button and the inner wall of the corresponding wing well are threaded, so that this element can be screwed into the wing well for retention. A convenient manner in which the button may be adjusted is shown, for example, as the slot 48, adapted for use with a flat-blade screwdriver.

Wave spring 38 extends between the retaining button and the bearing button, maintaining the separation between them and setting the selected maximum output torque. As can be appreciated, any resilient member having the requisite spring constant can be used at this point, given the size of the desired gap between the retainer button and the bearing button, as well as the magnitude and range of the expected torque. In the embodiment shown here, a wave spring, fabricated from steel and appropriately dimensioned, was chosen for its stiffness and durability.

Each sensor and control subassemby is inserted into a wing well, with the bearing area of the bearing button protruding through the wing aperture, the wave spring oriented against the bearing button, and the retainer button screwed into the wing aperture to provide the desired resistance at the bearing button. Although the present invention allows for field adjustment of the retainer button, those in the art will appreciate that it is desirable to set this position at the factory and to apply a spot of material such as lacquer at the periphery of the retainer button to seal it in position.

Figure 3:
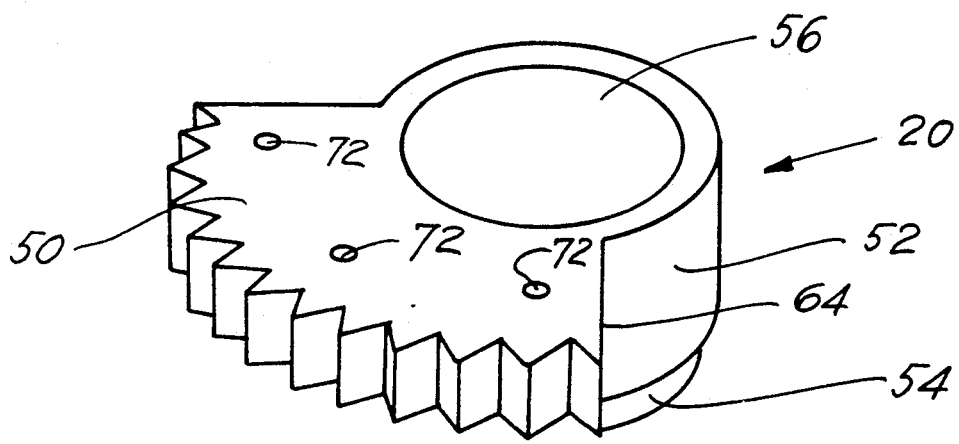
FIG. 3 is a pictorial of the input gear assembly of the embodiment shown in FIG. 1.

Coupling between the housing assembly and the damper actuator gear train is provided by input gear assembly 20, seen in FIGS. 1 and 3. Generally, this unit includes a sector gear 50 extending outward at a right angle from a collar 52, which encircles a bore 56. As can be understood from the assembly requirements set out below, it is preferred that the top of the sector gear be coincident with the top of collar 52. The location of the input gear assembly within the damper actuator is established by a locating aperture 60, formed in the actuator body, and designed to allow free rotation. A rotating ring 58, preferably formed from a plastic material having low friction characteristics, is inserted into the locating aperture, and a neck portion 54 of the collar is carried within the rotating ring. That position is arranged so that sector gear 50 meshes with the final gear 51 in power train 14. This assembly technique is conventional and well understood within the art.

Similarly, the lower portion 26 of the housing assembly hub is inserted into the input gear assembly's central bore 56 and rotationally carried there. A washer 62, preferably formed from a plastic material, may be inserted between the housing assembly and the input gear assembly to prevent binding. When so assembled, the sector gear 50 lies entirely within the wing angle A defined by the wing members 30, with the vertical ends 64 of the sector gear in registration with the bearing portions 44 of bearing buttons 36, where those elements protrude through wing apertures 42. This arrangement thus defines a power transmission path, from gear train 14 to the input gear assembly 20 to the housing assembly 18 to the output adapter 16.

The final control element is control subassembly 66, which cooperates with sensor subassembly 32. Here, two microswitches 68 are positioned on the sector gear 50 with their switch elements 69 extending beyond the ends 64 of the sector gear. It is convenient to locate these switches on a switch plate 70, having positioning pegs 74 or the like, adapted to the particular switches for ease of assembly and accuracy of position. The switch plate may be accurately and efficiently carried on the sector gear by pins 76 inserted into ejector holes 72 formed in the sector gear. The switches are connected in a conventional manner to the control system such that when either switch is depressed, the electric motor is cut off. The exact position of the switch elements may be selected by those in the art so that sufficient clearance is maintained between the sector gear and the housing assembly during normal operation, allowing a desired amount of deflection in the wave spring, yet the switch element is depressed before the sector gear end 64 makes contact with the opposing wing member.

Operation of the invention proceeds as follows. Within the normal range of damper travel, torque is applied to the sector gear 50 through gear train 14, causing the sector gear to rotate. A vertical end 64 of the sector gear makes contact with the bearing area 44 of bearing button 36, transmitting an intermediate torque as a force that is in turn transmitted to the wave spring 38. If the intermediate torque is less than the selected maximum output torque (as determined by the spring constant of the wave spring, modified by the position of retainer button 40), the wave spring is not compressed, and the intermediate torque is transmitted to wing member 30 of the housing 18. Rotation of the housing transmits the output torque on to the output adapter 16.

If, however, the intermediate torque exceeds the selected maximum output torque (because the damper is at the end of its normal range of travel or because some obstruction or failure has occurred), then wave spring 38 is compressed, and the resulting deflection of the bearing button 36 closes the gap between the vertical end 64 of the sector gear and the surface of wing member 30. When the wing member makes contact with the switch element of microswitch 68, the control system cuts off the power to the damper actuator motor, preventing further application of torque in that direction.

As can be seen, the present invention provides positive control of output torque without regard to the damper position. Thus, it does not matter whether the damper is actually at the end of its normal rotation, or whether an obstruction has been encountered; the system operator can be sure that excessive torque will never be applied to the damper shaft.

It will be understood that the present invention may be incorporated into a number of different environments and that modifications and changes may be made within the spirit of the invention. For example, the sensor subassembly could include various sorts of elements, designed to provide controlled deflection in a desired direction. Additionally, the invention is adaptable to a number of environments outside of damper control. These and other changes can be made without departing from the scope of the present invention, which is defined solely by the claims appended hereto.

We claim:

1. A output torque sensor operable in a gear train to receive an input torque and transmit that torque as an output torque only if the output torque is less than a preselected value, comprising:
    an input gear assembly, including a sector gear portion adapted to receive the input torque and to transmit an intermediate torque;
    a housing assembly, rotationally carried on said input gear assembly, generally cylindrical in form, having two wing members extending radially therefrom to include a wing angle encompassing said sector gear portion, and adapted to receive said intermediate torque and to transmit the output torque;
    torque sensing and control means, for limiting the output torque to the preselected value, including
    torque sensing means for determining the magnitude of said intermediate torque, a said sensing means carried on each said wing member to extend therefrom into said wing angle, and including resilient means for allowing said sensing means to change position on application thereto of said intermediate torque from said input gear assembly;
    torque control switch means, extending between each said wing member and said input gear assembly, adapted to send a control signal when the distance between said input gear assembly and a said wing member reaches a preselected value;
    such that an input torque applied to said input gear assembly is applied as said intermediate torque to said torque sensing and control means, said sensing and control means generating a control signal if the intermediate torque exceeds a preselected maximum output value, said intermediate torque otherwise being transmitted to said housing assembly for output as the output torque.

2. The output torque sensor of claim 1, wherein said wing angle is about ninety degrees.

3. The output torque sensor of claim 1, wherein said torque sensing means includes a bearing button, extending from said wing member into said wing angle; said resilient means biasing said bearing button; and a retainer button for retaining said bearing button and said resilient means.

4. The output torque sensor of claim 1, wherein said torque sensing means further includes means for adjusting said preselected torque value.

5. The output torque sensor of claim 1, wherein said resilient means is a wave spring.

6. The output torque sensor of claim 1, wherein each said torque sensing means is carried in a wing well formed in a said wing member.

7. The output torque sensor of claim 1, wherein said control switch means are two microswitches, carried on said sector gear such that the switch elements of said microswitches extends into the gaps between said sector gear portion and said wing members, said microswitches being connected such that contact by a said wing member against a said switch element will generate said control signal.

8. A output torque sensor operable in a gear train to receive an input torque and transmit that torque as an output torque only if the output torque is less than a preselected value, comprising:
    an input gear assembly, including a sector gear portion adapted to receive the input torque and to transmit an intermediate torque;
    a housing assembly, rotationally carried on said input gear assembly, generally cylindrical in form, having two wing members extending radially therefrom to include a wing angle of about ninety degrees, encompassing said sector gear portion and adapted to receive said intermediate torque and to transmit the output torque;
    torque sensing and control means, for limiting the output torque to the preselected value, including
    torque sensing means for determining the magnitude of said intermediate torque, a said sensing means carried on each said wing member in a wing well formed therein, extending therefrom into said wing angle, and including
        a bearing button, extending from said wing member into said wing angle through an aperture formed in said wing well;
        a wave spring for allowing said sensing means to change position on application thereto of said intermediate torque from said input gear assembly, carried in said wing well to bias said bearing button; and
        a retainer button for retaining said bearing button and wave spring within said wing well, adapted for adjusting said preselected torque value by the position thereof relative to said wing well;
    torque control switch assemblies, extending between each said wing member and said input gear assembly, adapted to send a control signal when the distance between said input gear assembly and a said wing member reaches a preselected value; each switch assembly including two microswitches, carried on said sector gear portion such that the switch elements of said microswitches extends into the gaps between said sector gear portion and said wing members, said microswitches being connected such that contact by a said wing member against a said switch element will generate said control signal.
    such that an input torque applied to said input gear assembly is applied as said intermediate torque to said torque sensing and control means, said sensing and control means generating a control signal if the intermediate torque exceeds a preselected maximum output value, said intermediate torque otherwise being transmitted to said housing assembly for output as the output torque.

* * * * *